(12) United States Patent
Reiter

(10) Patent No.: US 9,355,093 B2
(45) Date of Patent: May 31, 2016

(54) METHOD AND APPARATUS FOR REFERRING EXPRESSION GENERATION

(71) Applicant: ARRIA DATA2TEXT LIMITED, Aberdeen (GB)

(72) Inventor: Ehud Baruch Reiter, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

(21) Appl. No.: 14/634,119

(22) Filed: Feb. 27, 2015

(65) Prior Publication Data

US 2015/0169548 A1 Jun. 18, 2015

Related U.S. Application Data

(63) Continuation of application No. PCT/US2012/053183, filed on Aug. 30, 2012.

(51) Int. Cl.
*G06F 17/21* (2006.01)
*G06F 17/27* (2006.01)
*G06F 17/28* (2006.01)

(52) U.S. Cl.
CPC ................................. *G06F 17/2881* (2013.01)

(58) Field of Classification Search
USPC .............................................................. 704/9
See application file for complete search history.

(56) References Cited

U.S. PATENT DOCUMENTS

| | | | |
|---|---|---|---|
| 5,181,250 A | 1/1993 | Morgan et al. | |
| 5,237,502 A | 8/1993 | White et al. | |
| 5,311,429 A | 5/1994 | Tominaga | |
| 5,321,608 A | 6/1994 | Namba et al. | |
| 5,794,177 A | 8/1998 | Carus et al. | |
| 5,802,488 A | 9/1998 | Edatsune | |
| 6,023,669 A | 2/2000 | Suda et al. | |

(Continued)

FOREIGN PATENT DOCUMENTS

| | | |
|---|---|---|
| EP | 1 336 955 B1 | 5/2006 |
| JP | 61-221873 A | 10/1986 |

(Continued)

OTHER PUBLICATIONS

Paraboni, "Generating references in hierarchical domains: the case of Document Deixis", 2003, University of Brighton PhD thesis, pp. 1-207.*

(Continued)

*Primary Examiner* — Olujimi Adesanya
(74) *Attorney, Agent, or Firm* — Alston & Bird LLP

(57) ABSTRACT

Methods, apparatuses, and computer program products are described herein that are configured to perform referring expression generation. In some example embodiments, a method is provided that comprises identifying an intended referent to be referred to in a textual output. The method of this embodiment may also include determining that a salient ancestor of the intended referent is lower in a part-of hierarchy than a lowest common ancestor. The method of this embodiment may also include causing the salient ancestor to be set as a current target referent and a new salient ancestor to be determined for the current target referent. In some example embodiments, the default descriptor of each current target referent is added to the referring noun phrase and the part-of hierarchy is traversed via salient ancestor links until the new salient ancestor of the current target referent is higher than or equal to the lowest common ancestor.

22 Claims, 6 Drawing Sheets

(56) References Cited

U.S. PATENT DOCUMENTS

| | | | |
|---|---|---|---|
| 6,078,914 A | 6/2000 | Redfern | |
| 6,138,087 A | 10/2000 | Budzinski | |
| 6,266,617 B1 | 7/2001 | Evans | |
| 6,442,485 B2 | 8/2002 | Evans | |
| 6,466,899 B1 | 10/2002 | Yano et al. | |
| 6,665,640 B1 | 12/2003 | Bennett et al. | |
| 6,947,885 B2 | 9/2005 | Bangalore et al. | |
| 7,043,420 B2 | 5/2006 | Ratnaparkhi | |
| 7,062,483 B2* | 6/2006 | Ferrari | G06F 17/30873 |
| 7,167,824 B2 | 1/2007 | Kallulli | |
| 7,231,341 B2 | 6/2007 | Bangalore et al. | |
| 7,238,313 B2 | 7/2007 | Ferencz et al. | |
| 7,305,336 B2 | 12/2007 | Polanyi et al. | |
| 7,310,969 B2 | 12/2007 | Dale | |
| 7,346,493 B2 | 3/2008 | Ringger et al. | |
| 7,418,447 B2 | 8/2008 | Caldwell et al. | |
| 7,424,363 B2 | 9/2008 | Cheng et al. | |
| 7,444,287 B2 | 10/2008 | Claudatos et al. | |
| 7,493,253 B1* | 2/2009 | Ceusters | G06F 17/2775 704/10 |
| 7,496,621 B2 | 2/2009 | Pan et al. | |
| 7,526,424 B2 | 4/2009 | Corston-Oliver et al. | |
| 7,533,089 B2 | 5/2009 | Pan et al. | |
| 7,562,005 B1 | 7/2009 | Bangalore et al. | |
| 7,684,991 B2 | 3/2010 | Stohr et al. | |
| 7,711,581 B2 | 5/2010 | Hood et al. | |
| 7,783,486 B2 | 8/2010 | Rosser et al. | |
| 7,809,552 B2 | 10/2010 | Pan et al. | |
| 7,849,048 B2 | 12/2010 | Langseth et al. | |
| 7,849,049 B2 | 12/2010 | Langseth et al. | |
| 7,856,390 B2 | 12/2010 | Schiller | |
| 7,873,509 B1 | 1/2011 | Budzinski | |
| 7,921,091 B2 | 4/2011 | Cox et al. | |
| 7,930,169 B2 | 4/2011 | Billerey-Mosier | |
| 7,933,774 B1 | 4/2011 | Begeja et al. | |
| 7,966,172 B2 | 6/2011 | Ruiz et al. | |
| 7,970,601 B2 | 6/2011 | Burmester et al. | |
| 7,979,267 B2 | 7/2011 | Ruiz et al. | |
| 8,019,610 B2 | 9/2011 | Walker et al. | |
| 8,024,331 B2 | 9/2011 | Calistri-Yeh et al. | |
| 8,037,000 B2 | 10/2011 | Delmonico et al. | |
| 8,082,144 B1 | 12/2011 | Brown et al. | |
| 8,090,727 B2 | 1/2012 | Lachtarnik et al. | |
| 8,150,676 B1 | 4/2012 | Kaeser | |
| 8,175,873 B2 | 5/2012 | Di Fabbrizio et al. | |
| 8,180,647 B2 | 5/2012 | Walker et al. | |
| 8,180,758 B1 | 5/2012 | Cornali | |
| 8,204,751 B1* | 6/2012 | Di Fabbrizio | G06F 17/271 704/256 |
| 8,229,937 B2 | 7/2012 | Kiefer et al. | |
| 8,355,903 B1 | 1/2013 | Birnbaum et al. | |
| 8,374,848 B1 | 2/2013 | Birnbaum et al. | |
| 8,425,325 B2 | 4/2013 | Hope | |
| 8,473,911 B1 | 6/2013 | Baxter | |
| 8,494,944 B2 | 7/2013 | Schiller | |
| 8,515,737 B2 | 8/2013 | Allen | |
| 8,616,896 B2 | 12/2013 | Lennox | |
| 8,626,613 B2 | 1/2014 | Dale et al. | |
| 8,676,691 B2 | 3/2014 | Schiller | |
| 8,984,051 B2 | 3/2015 | Olsen et al. | |
| 2002/0026306 A1 | 2/2002 | Bangalore et al. | |
| 2003/0131315 A1 | 7/2003 | Escher | |
| 2003/0182102 A1* | 9/2003 | Corston-Oliver | G06F 17/2881 704/9 |
| 2004/0246120 A1 | 12/2004 | Benner et al. | |
| 2005/0039107 A1 | 2/2005 | Hander et al. | |
| 2005/0228635 A1 | 10/2005 | Araki et al. | |
| 2005/0256703 A1 | 11/2005 | Markel | |
| 2006/0178868 A1 | 8/2006 | Billerey-Mosier | |
| 2006/0259293 A1 | 11/2006 | Orwant | |
| 2007/0078655 A1 | 4/2007 | Semkow et al. | |
| 2007/0106628 A1 | 5/2007 | Adjali et al. | |
| 2007/0129942 A1 | 6/2007 | Ban et al. | |
| 2007/0143099 A1 | 6/2007 | Balchandran et al. | |
| 2008/0221865 A1 | 9/2008 | Wellmann | |
| 2008/0221870 A1 | 9/2008 | Attardi et al. | |
| 2008/0281781 A1 | 11/2008 | Zhao et al. | |
| 2008/0312954 A1 | 12/2008 | Ullrich et al. | |
| 2009/0076799 A1* | 3/2009 | Crouch et al. | 704/9 |
| 2009/0089100 A1 | 4/2009 | Nenov et al. | |
| 2009/0089126 A1 | 4/2009 | Odubiyi | |
| 2009/0111486 A1 | 4/2009 | Burstrom | |
| 2009/0156229 A1 | 6/2009 | Hein et al. | |
| 2009/0198496 A1 | 8/2009 | Denecke | |
| 2009/0281839 A1 | 11/2009 | Lynn et al. | |
| 2010/0146491 A1 | 6/2010 | Hirano et al. | |
| 2010/0153095 A1 | 6/2010 | Yang et al. | |
| 2010/0153105 A1* | 6/2010 | Di Fabbrizio et al. | 704/235 |
| 2010/0174545 A1 | 7/2010 | Otani | |
| 2010/0191658 A1 | 7/2010 | Kannan et al. | |
| 2010/0203970 A1 | 8/2010 | Hope | |
| 2010/0241421 A1* | 9/2010 | Funakoshi | 704/201 |
| 2010/0325608 A1* | 12/2010 | Radigan | G06F 8/456 717/106 |
| 2010/0332235 A1 | 12/2010 | David | |
| 2011/0010164 A1 | 1/2011 | Williams | |
| 2011/0068929 A1 | 3/2011 | Franz et al. | |
| 2011/0087486 A1 | 4/2011 | Schiller | |
| 2011/0160986 A1 | 6/2011 | Wu et al. | |
| 2011/0179006 A1 | 7/2011 | Cox et al. | |
| 2011/0218822 A1 | 9/2011 | Buisman et al. | |
| 2011/0225185 A1 | 9/2011 | Gupta | |
| 2011/0257839 A1 | 10/2011 | Mukherjee | |
| 2012/0078888 A1 | 3/2012 | Brown et al. | |
| 2012/0131008 A1* | 5/2012 | Ahn et al. | 707/741 |
| 2012/0136649 A1 | 5/2012 | Freising et al. | |
| 2012/0158089 A1 | 6/2012 | Bocek et al. | |
| 2012/0173475 A1 | 7/2012 | Ash et al. | |
| 2012/0310990 A1 | 12/2012 | Viegas et al. | |
| 2013/0013290 A1* | 1/2013 | Funakoshi et al. | 704/9 |
| 2013/0030810 A1 | 1/2013 | Kopparapu et al. | |
| 2013/0041921 A1* | 2/2013 | Cooper et al. | 707/780 |
| 2013/0066873 A1 | 3/2013 | Salvetti et al. | |
| 2013/0144606 A1 | 6/2013 | Birnbaum et al. | |
| 2013/0145242 A1 | 6/2013 | Birnbaum et al. | |
| 2013/0174026 A1 | 7/2013 | Locke | |
| 2013/0185050 A1 | 7/2013 | Bird et al. | |
| 2014/0062712 A1 | 3/2014 | Reiter | |
| 2014/0067377 A1 | 3/2014 | Reiter | |

FOREIGN PATENT DOCUMENTS

| | | |
|---|---|---|
| JP | 2004-21791 A | 1/2004 |
| WO | WO-00/74394 A2 | 12/2000 |
| WO | WO-02/31628 A2 | 4/2002 |
| WO | WO-02/073449 A1 | 9/2002 |
| WO | WO-02/073531 A1 | 9/2002 |
| WO | WO-02/031628 A3 | 10/2002 |
| WO | WO 2006/010044 A2 | 1/2006 |
| WO | WO-2007/041221 A1 | 4/2007 |
| WO | WO-2009/014465 A2 | 1/2009 |
| WO | WO-2010/049925 A2 | 5/2010 |
| WO | WO-2010/051404 A1 | 5/2010 |
| WO | WO-2012/071571 A2 | 5/2012 |
| WO | WO-2013/042115 A2 | 3/2013 |
| WO | WO-2013/042116 A1 | 3/2013 |

OTHER PUBLICATIONS

Siddharthan et al, "Generating referring expressions in open domains", 2004, In Proceedings of ACL 2004, pp. 1-8.*

Paraboni, "Generating Referring Expressions: Making Referents Easy to Identify" 2007, In Computational Linguistics, vol. 33(2), pp. 229-254.*

International Search Report and Written Opinion from International Application No. PCT/US2012/053183, mailed Jun. 4, 2013.

Reiter, E. et al., *Studies in Natural Language Processing—Building Natural Language Generation Systems*, Cambridge University Press, (2000) 138 pages.

Statement in accordance with the Notice from European Patent Office dated Oct. 1, 2007 concerning business methods (OJ EPO Nov. 2007, 592-593), (XP002456414) 1 page.

(56) References Cited

OTHER PUBLICATIONS

International Search Report and Written Opinion for Application No. PCT/IB2012/056513 dates Jun. 26, 2013.
International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053218 dated Jun. 27, 2013.
International Search Report and Written Opinion for Application No. PCT/US2012/053156 dated Sep. 26, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
International Search Report for Application No. PCT/IB2013/058131 dated Jul. 3, 2014.
Alawneh, A. L. et al., *Pattern Recognition Techniques Applied to the Abstraction of Traces of Inter-Process Communication*, Software Maintenance and Reengineering (CSMR), 2011 15$^{th}$ European Conference on Year: 2011, IEEE Conference Publications (2011) pp. 211-220.
Andre, E. et al., *From Visual Data to Multimedia Presentations*, Grounding Representations: Integration of Sensory Information in Natural Language Processing, Artificial Intelligence and Neural networks, IEE Colloquium On (May 15, 1995) pp. 1-3.
Andre, E. et al., *Natural Language Access to Visual Data: Dealing with Space and Movement*, Report 63, German Research Center for Artificial Intelligence (DFKI) SFB 314, Project VITRA, (Nov. 1989) 1-21.
Barzilay, R., et al.; "*Aggregation via Set Partitioning for Natural Language Generation*;" Proceedings of the Human Language Technology Conference of the North American Chapter of the ACL; pp. 359-366; dated Jun. 2006.
Bhoedjang, R. A. F. et al., *Optimizing Distributed Data Structures Using Application-Specific Network Interface Software*, Parallel Processing, 1998, Proceedings; 1998 International Conference Conference on Year: 1998, IEEE Conference Publications (1998) pp. 485-492.
Cappozzo, A. et al., *Surface-Marker Cluster Design Criterian for 3-D Bone Movement Reconstruction*, IEEE Transactions on Biomedical Engineering, vol. 44, No. 12 (Dec. 1997) 1165.
Dragon, R. et al., *Multi-Scale Clustering of Frame-to-Frame Correspondences for Motion Segmentation*, Computer Vision ECCV 2012, Springer Berlin Heidelberg (Oct. 7, 2012) 445-458.
Gatt, A. et al., *From Data to Text in the Neonatal Intensive Care Unit: Using NLG Technology for Decision Support and Information Management*, AI Communication (Jan. 1, 2009) 153-186.
Gorelov, S. s. et al., *Search Optimization in Semistructured Databases Using Hierarchy of Document Schemas*, Programming and Computer Software, vol. 31, No. 6 (2005) 321-331.
Hercules, D., et al.; "*Aggregation in Natural Language Generation*;" Trends in Natural Language Generation, an Artificial Intelligence Perspective; pp. 88-105; dated Apr. 1993.
Herzog, G. et al., *Combining Alternatives in the Multimedia Presentation of Decision Support Information for Real-Time Control*IFIP (1998) 15 pages.

Kottke, D. P. et al., *Motion Estimation Via Cluster Matching*, 8180 IEEE Transactions on Pattern Analysis and Machine Intelligence 16, No. 11 (Nov. 1994) 1128-1132.
Leonov, A. v. et al., *Construction of an Optimal Relational Schema for Storing XML Documents in an RDBMS Without Using DTD/XML Schema*, Programming and Computer Software, vol. 30, No. 6 (2004) 323-336.
Perry, B. et al., *Automatic Realignment of Data Structures to Improve MPI Performance*, Networks (ICN), 2010 Ninth International Conference on Year: 2010, IEEE Conference Publications (2010) pp. 42-47.
Quinlan, J. R., *Induction of Decision Trees*, Machine Learning, Kluwer Academic Publishers, vol. 1, No. 1 (Jan. 1, 1986) 81-106.
Radev, D. R. et al., *Generating Natural Language Summaries from Multiple On-Line Sources*, Association of Computational Linguistics, vol. 24, No. 3 (1998) 469-500.
Reiter, E., *An Architecture for Data-to-Text Systems*, Proceedings of ENLG-2007 (Jun. 20, 2007) 97-104.
Reiter, E. et al., *Building Applicaed Language Generation Systems*, Natural Language Engineering 1 (1) (1995) 31 pages.
Shaw, J.; "*Clause Aggregation Using Linguistic Knowledge*;" Proceedings of IWNLG; pp. 138-147; dated Jan. 1998; retrieved from <http://acl.ldc.upenn.edu/W/W98/W98-1415.pdf>.
Spillner, J. et al., *Algorithms for Dispersed Processing*, Utility and Cloud Computing (UC), 204 IEEE/ACM 7$^{th}$ International Conference on Year: 2014, IEEE Conferenced Publications (2014) pp. 914-921.
Voelz, D. et al., *Rocco: A RoboCup Soccer Commentator System*, German Research Center for Artificial Intelligence DFKI GmbH (1999) 11 pages.
Yu, J. et al., *Choosing the Content of Textual Summaries of Large Time-Series Data Sets*, Natural Language Engineering 13, (Jan. 1, 2007) pp. 1-28.
Office Action for U.S. Appl. No. 14/023,023 dated Mar. 4, 2014.
Notice of Allowance for U.S. Appl. No. 14/023,023 dated Apr. 11, 2014.
Office Action for U.S. Appl. No. 14/023,056 dated Nov. 21, 2013.
Notice of Allowance for U.S. Appl. No. 14/023,056 dated Apr. 29, 2014.
Office Action for U.S. Appl. No. 14/027,775 dated Jul. 13, 2015.
Notice of Allowance for U.S. Appl. No. 14/027,775 dated Aug. 12, 2015.
U.S. Appl. No. 12/779,636; entitled "System and Method for Using Data to Automatically Generate a Narrative Story".
U.S. Appl. No. 13/186,308; entitled "Method and Apparatus for Triggering the Automatic Generation of Narratives".
U.S. Appl. No. 13/186,329; entitled "Method and Apparatus for Triggering the Automatic Generation of Narratives".
U.S. Appl. No. 13/186,337; entitled "Method and Apparatus for Triggering the Automatic Generation of Narratives".
U.S. Appl. No. 13/186,346; entitled "Method and Apparatus for Triggering the Automatic Generation of Narratives".
U.S. Appl. No. 13/464,635; entitled "Use of Tools and Abstraction in a Configurable and Portable System for Generating Narratives".
U.S. Appl. No. 13/464,675; entitled "Configurable and Portable System for Generating Narratives".
U.S. Appl. No. 13/464,716; entitled "Configurable and Portable System for Generating Narratives".
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10 2013.
U.S. Appl. No. 14/027,684, filed Sep. 16, 2013; In re: Sripad et al., entitled *Method, Apparatus, and Computer Program Product for User-Directed Reporting*.
U.S. Appl. No. 14/027,775; entitled "Method and Apparatus for Interactive Reports", filed Sep. 16, 2013.

* cited by examiner

METHOD AND APPARATUS FOR REFERRING EXPRESSION GENERATION

CROSS-REFERENCE TO RELATED APPLICATIONS

This application is a continuation of International Application No. PCT/US2012/053183, filed Aug. 30, 2012, which is hereby incorporated herein in its entirety by reference.

TECHNOLOGICAL FIELD

Embodiments of the present invention relate generally to natural language generation technologies and, more particularly, relate to a method, apparatus, and computer program product for referring expression generation.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to perform referring expression generation. In some example embodiments, a method is provided that comprises identifying an intended referent to be referred to in a textual output. The method of this embodiment may also include determining a lowest common ancestor for the intended referent and a previously referred-to entity within a part-of hierarchy. The method of this embodiment may also include determining that a salient ancestor of the intended referent is lower in the part-of hierarchy than the lowest common ancestor in an instance in which the intended referent is marked as not salient. The method of this embodiment may also include causing the salient ancestor to be set as a current target referent and a new salient ancestor to be determined for the current target referent. In some example embodiments, the default descriptor of each current target referent is added to the referring noun phrase and the part-of hierarchy is traversed via salient ancestor links until the new salient ancestor of the current target referent is higher than or equal to the lowest common ancestor.

BRIEF DESCRIPTION OF THE DRAWINGS

Figure 1:
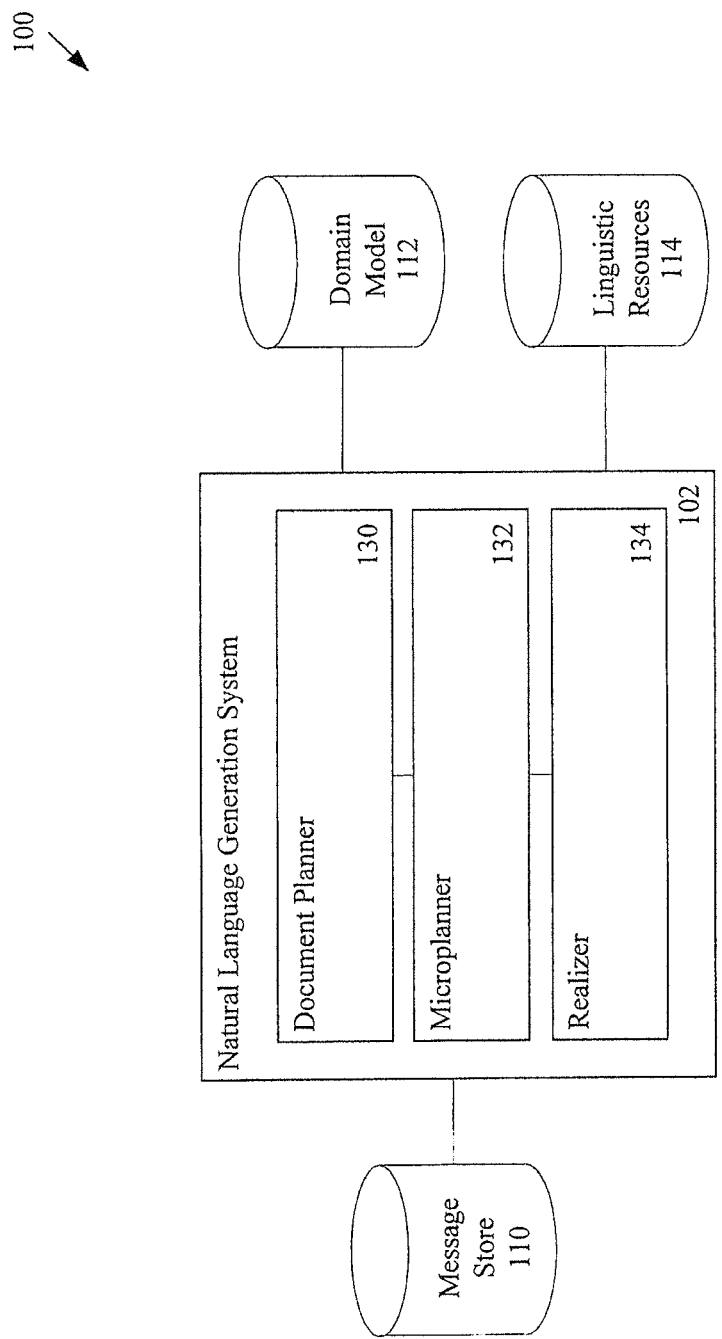
Figure 2:
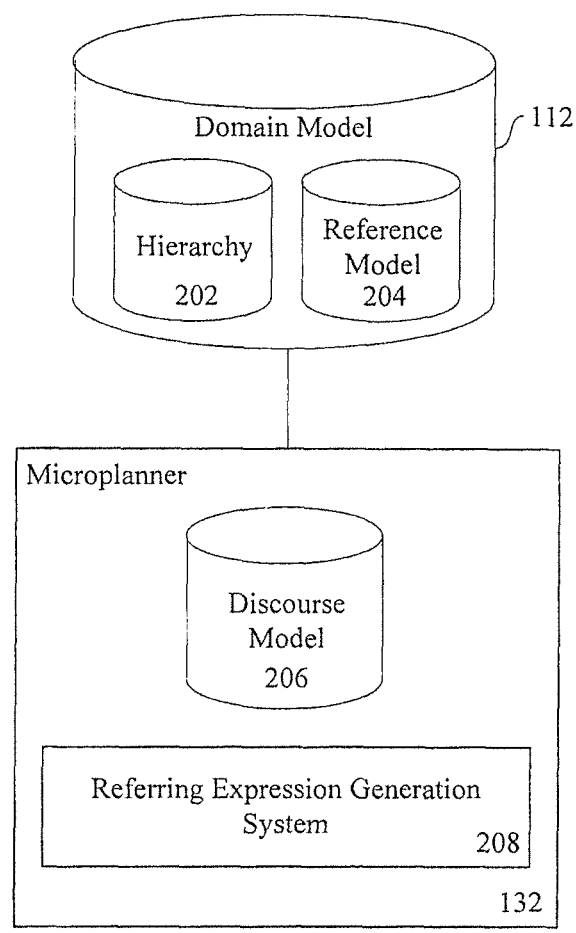
Figure 3:
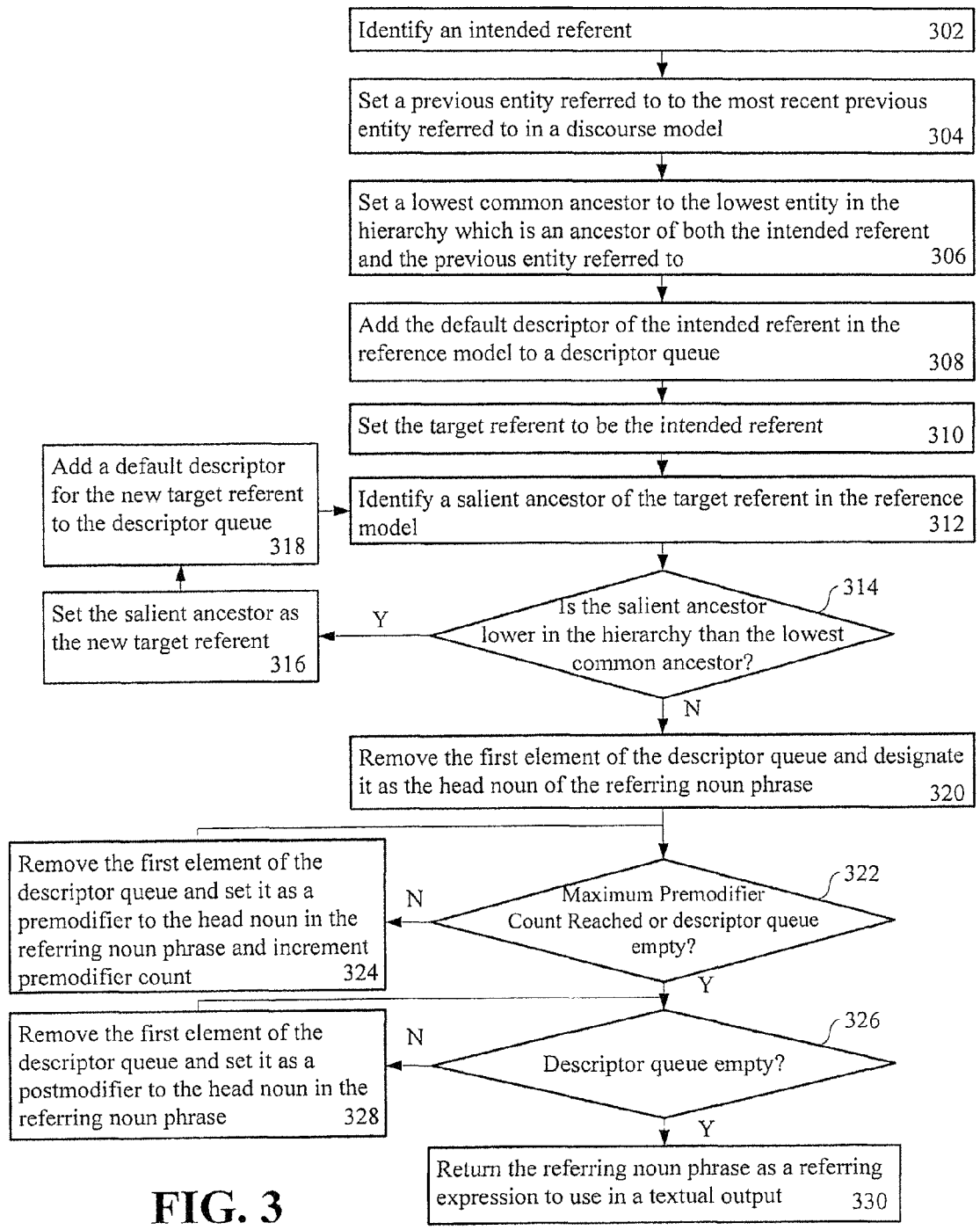
Figure 4:
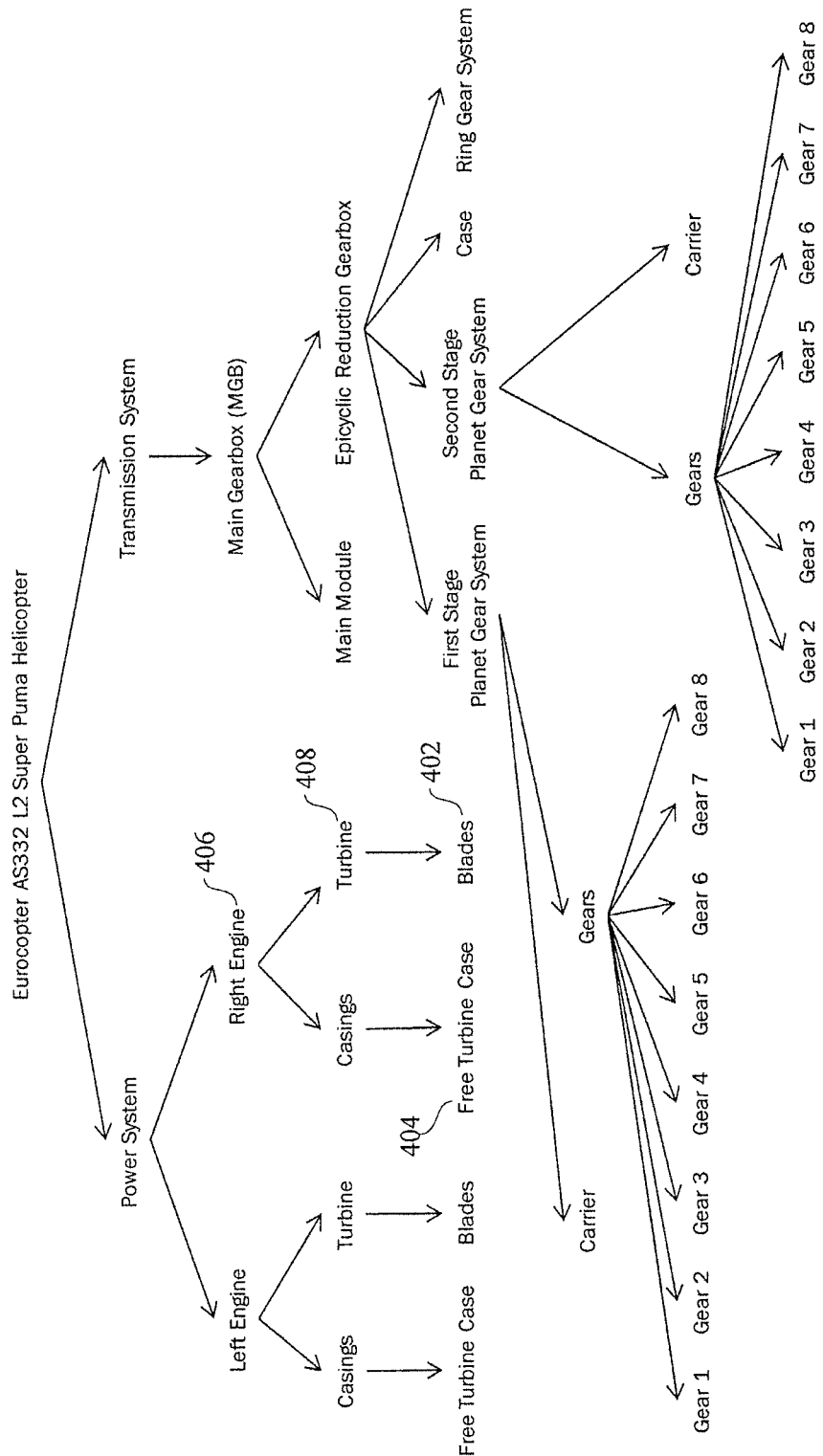
Figure 5:
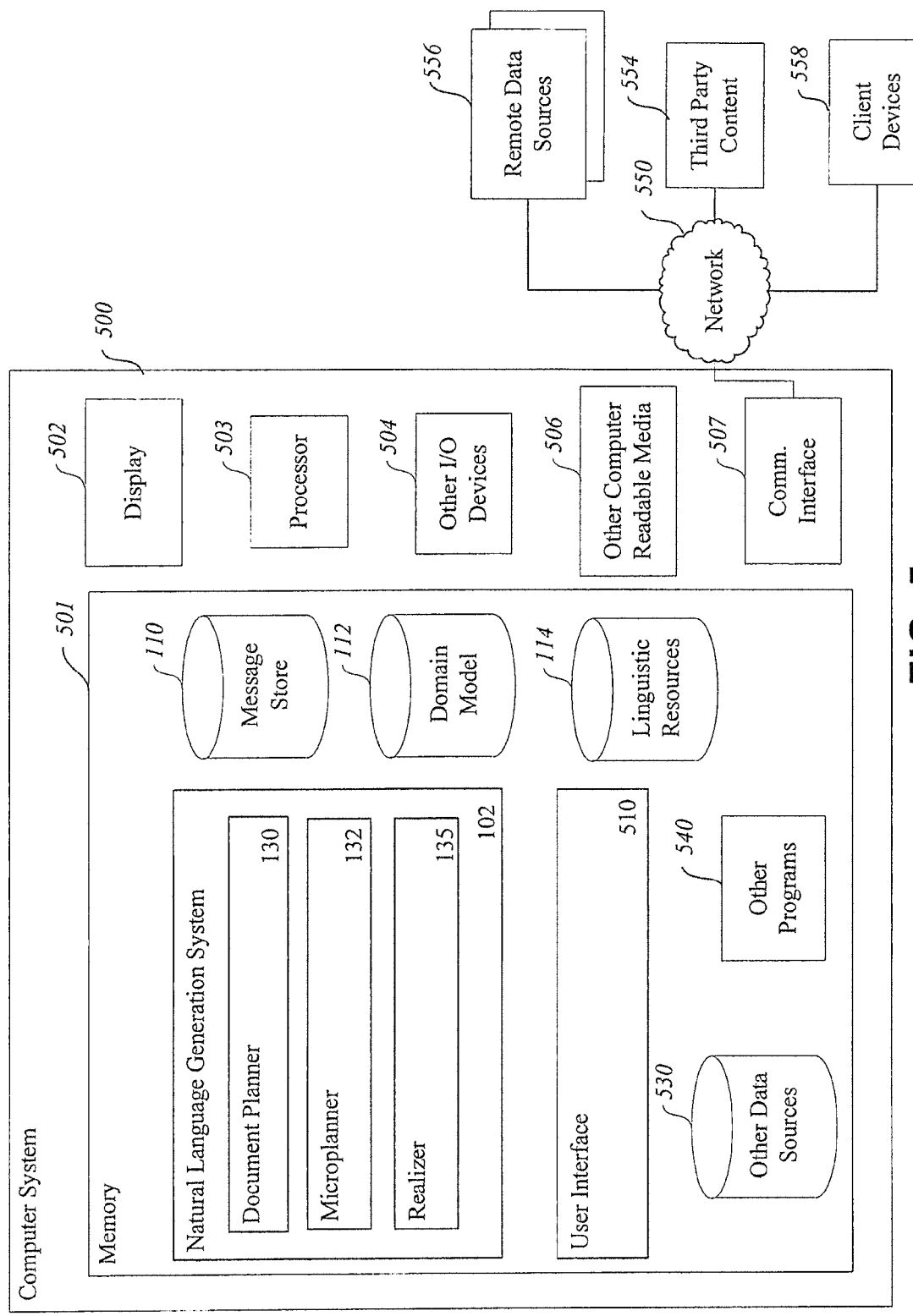
Figure 6:
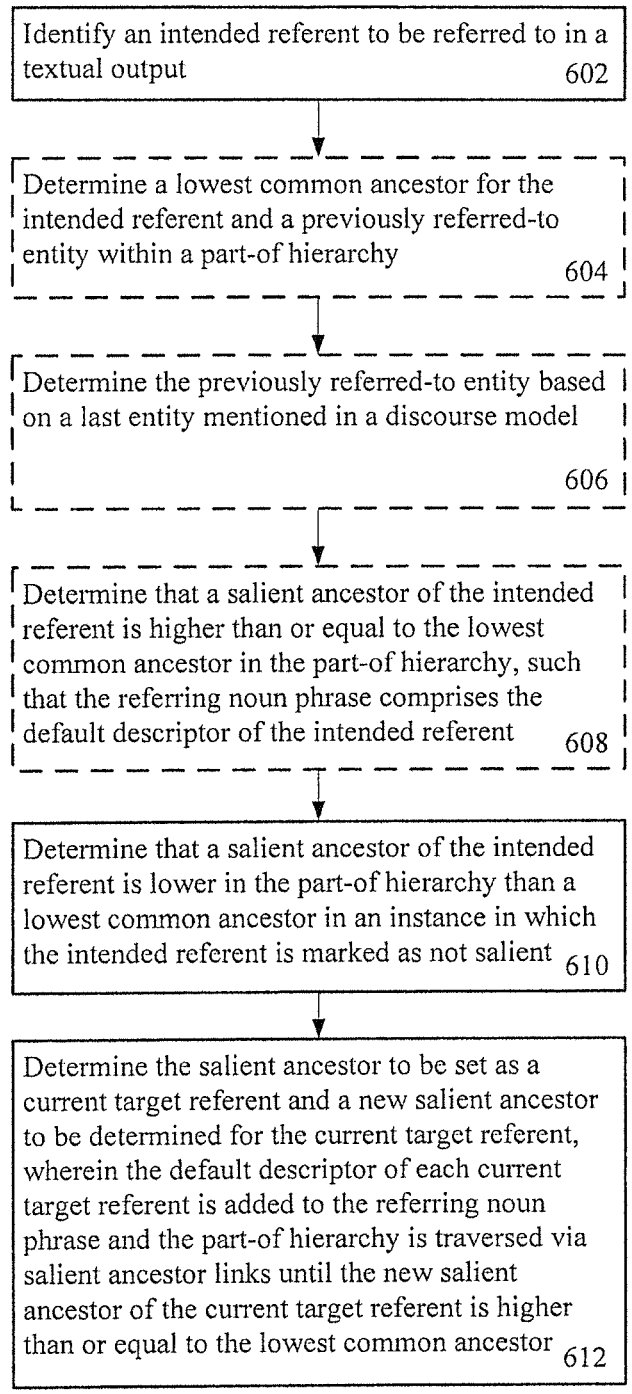

Having thus described embodiments of the invention in general terms, reference will now be made to the accompanying drawings, which are not necessarily drawn to scale, and wherein:

FIG. 1 is a schematic representation of natural language generation environment that may benefit from some example embodiments of the present invention;

FIG. 2 illustrates an example referring expression generation system according to some example embodiments described herein;

FIG. 3 illustrates an example flow diagram that may be performed by the referring expression generation system in accordance with some example embodiments of the present invention;

FIG. 4 illustrates an example hierarchy that may be accessed by the referring expression generation system in accordance with some example embodiments of the present invention;

FIG. 5 illustrates a block diagram of an apparatus that embodies a referring expression generation system in accordance with some example embodiments of the present invention; and FIG. 6 illustrates a flowchart that may be performed by a referring expression generation system in accordance with some example embodiments of the present invention.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Natural language texts that describe one or more entities, such as those entities that have a complex internal structure (e.g. machine parts, geographic locations, equipment or the like), include a number of assets (e.g. listing of vehicles) or the like, use referring expressions to identify particular intended referents (e.g. components and sub components). In some examples, a referring expression is any noun phrase, or surrogate for a noun phrase, whose function in a text is to identify an individual person, place, object, or a set of persons, places, objects or the like. Referring expressions are generated based on the discourse context (e.g. the previously generated text) and the genre of the text (e.g. engineering maintenance manuals often use different referring expressions from operational manuals).

However, in order to generate referring expressions that describe an entity, a decision must be made about how much information to include in each referring expression. For example, a referring expression that has limited information may cause a reader to become confused, whereas an expression with too much information may reduce readability and effectiveness of a text. By way of further example, in a complex system, one or more of the following referring expressions that describe a blade component may be generated based on a hierarchy (see e.g. FIG. 4): "the blades"; "the turbine blades"; "the right engine's turbine blades"; "the turbine blades of the power system's right engine"; "the turbine blades of the right engine of the Super Puma's power system"; and/or "the turbine blades of the Super Puma's right engine".

In order to generate or otherwise select a referring expression to be included in a textual output, methods, apparatuses, and computer program products are described herein that are configured to generate a referring expression in the form of a referring noun phrase using a part-of hierarchy, a reference model and/or a discourse model. In particular, a microplanner, having a referring expression generation system, may be configured to generate the referring expression based on a default descriptor for a particular entity to be referred to (the intended referent) and one or more salient ancestors of the intended referent. Further, the referring expression generation system may also be configured to determine a previously referred-to entity and, as such, may then identify a lowest common ancestor in the hierarchy of the intended referent and the previously referred-to entity. A salient ancestor (e.g. a prominent or important parent in the hierarchy) may also be determined for the intended referent. In an instance in which the salient ancestor is higher than or equal to the lowest common ancestor, then the default descriptor of the intended referent may become the referring expression. However, in an instance in which the salient ancestor of the intended referent is lower in the hierarchy than the lowest common ancestor, the default descriptors of one or more salient ancestors (e.g. via one or more salient links) of an intended referent may be formed together with a default descriptor of the intended referent to generate a referring expression.

FIG. 1 is an example block diagram of example components of an example natural language generation environment 100. In some example embodiments, the natural language generation environment 100 comprises a natural language generation system 102, message store 110, a domain model 112 and/or linguistic resources 114. The natural language generation system 102 may take the form of, for example, a code module, a component, circuitry and/or the like. The components of the natural language generation environment 100 are configured to provide various logic (e.g. code, instructions, functions, routines and/or the like) and/or services related to the natural language generation system, the microplanner and a referring expression generation system.

A message store 110 or knowledge pool is configured to store one or more messages that are accessible by the natural language generation system 102. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario. In some examples, the domain model 112 is a representation of information about a particular domain. For example, a domain model may contain an ontology that specifies the kinds of objects, instances, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe an object, such as an engine, a user may want to know which engine is being referred to, a status of the engine, a condition of the engine and/or the like. In some cases, the user may not want to know an engine temperature, but instead want to be warned in an instance in which the engine temperature is at a dangerous level. For example, "the right engine is too hot." In other examples, the engine being too hot may be linked to a resultant condition, for example "after investigating the crash, it appears the right engine was too hot."

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others, however, may be derived from the observations by means of a process of inference or based on one or more detected events. For example, the presence of rain may be indicative of other conditions, such as the potential for snow at some temperatures.

Messages may be instantiated based on many variations of source data, such as but not limited to time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news story in order to generate a news story. Whereas, in other examples, messages may be built based on survey responses and/or event data.

Messages may be annotated with an indication of their relative importance; this information can be used in subsequent processing steps or by the natural language generation system 102 to make decisions about which information may be conveyed and which information may be suppressed. Alternatively or additionally, messages may include information on relationships between the one or more messages.

In some example embodiments, a natural language generation system, such as natural language generation system 102, is configured to generate phrases, sentences, text or the like which may take the form of a natural language text. The natural language generation system 102 comprises a document planner 130, a microplanner 132 and/or a realizer 134. The natural language generation system 102 may also be in data communication with the message store 110, the domain model 112 and/or the linguistic resources 114. In some examples, the linguistic resources include, but are not limited to, text schemas, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 is configured to input the one or more messages from the message store 110. The document planner 130 is further configured to determine how to arrange those messages in order to describe the patterns in the one or more data channels derived from the raw input data. The document planner 130 may comprise a content determination process that is configured to select the messages, such as the messages that contain a representation of the data that is to be output via a natural language text.

The document planner 130 may also comprise a structuring process that determines the order of messages to be included in a text. In some example embodiments, the document planner 130 may access one or more text schemas for the purposes of content determination and document structuring. A text schema is a rule set that defines the order in which a number of messages are to be presented in a document. For example, a medication injection message may be described prior to a heart rate spike message. In other examples, a steady respiration rate message may be described after, but in relation to, the heart rate spike message.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other.

The microplanner 132 is configured to construct a text specification based on the document plan from the document planner 130, such that the document plan may be expressed in natural language. In some example embodiments, the microplanner 132 may perform aggregation, lexicalization and referring expression generation. In some examples, aggregation includes, but is not limited to, determining whether two or more messages can be combined together linguistically to produce a more complex phrase specification. For example, one or more messages may be aggregated so that both of the messages can be described by a single sentence. In some examples, lexicalization includes, but is not limited to, choosing particular words for the expression of concepts and relations. In some examples, referring expression generation includes, but is not limited to, choosing how to refer to an entity so that it can be unambiguously identified by the reader. Referring expression generation is further described with respect to at least FIGS. 2 and 3. The output of the microplanner 132, in some example embodiments, is a tree-structured realization specification whose leaf-nodes are phrase specifications, and whose internal nodes express rhetorical relations between the leaf nodes.

A realizer 134 is configured to traverse a text specification output by the microplanner 132 to express the text specification in natural language. The realization process that is applied to each phrase specification makes use of a grammar (e.g. the grammar of the linguistic resources 114) which specifies the valid syntactic structures in the language and further provides a way of mapping from phrase specifications into the corresponding natural language sentences. The output of the process is, in some example embodiments, a natural language text. In some examples, the natural language text may include embedded mark-up.

FIG. 2 illustrates an example referring expression generation system 208 embodied by a microplanner 132 according to some example embodiments described herein. The referring expression generation system 208, in some example embodiments, is configured to generate a referring expression (e.g. a referring noun phrase) for an intended referent found in one or more messages within a document plan. The referring expression may then be used to populate an element of a phrase specification in the text specification generated by the microplanner 132.

In some example embodiments and in order to generate the referring expression, the referring expression generation system 208 is configured to access or otherwise be in data communication with a data model 112 that may additionally comprise or otherwise embodies at least a hierarchy 202 (e.g. a part-of hierarchy such as the hierarchy shown in FIG. 4, or the like), a reference model 204 and/or the like. The reference model 204 specifies additional information about the components in the hierarchy 202. For example, the reference model 204 may provide a default descriptor for an entity and may further identify a salient ancestor for that entity. In some examples, a default descriptor is the name used for a particular entity in a text in an instance in which no additional information about higher level entities in the hierarchy 202 is provided. For example, the default descriptor of Eurocopter AS332 Super Puma Helicopter shown in FIG. 4 may be "Super Puma". "Super Puma" may provide enough information for a reader in a helicopter or aircraft genre or domain to identify that the intended referent of "Super Puma" is a Eurocopter AS332. As such, the default descriptor typically used for a given entity in a genre may not be as rich or as complicated as the full name or nomenclature used in an underlying hierarchy.

In some examples, a salient ancestor is an ancestor of an intended referent in the hierarchy 202 that may be added to a referring expression in an instance in which it is insufficient to use the default descriptor of the intended referent alone. In some examples, the salient ancestor is the intended referent's parent in the hierarchy 202; however, in other examples one or more levels within the hierarchy 202 may be skipped or marked as to be ignored. For example and with reference to FIG. 4, the reference model 204 may indicate in the helicopter genre that the salient ancestor of the left engine is the Super Puma and not its parent, the power system. Such a rule may be present because the genre may specify that an engine is to be referred to as "the Super Puma's left engine", not "the power system's left engine" or "the Super Puma's power system's left engine". Alternatively or additionally, the reference model 204 may be configured to include multiple Boolean flags for each entity, such that the Boolean flags are configured to indicate whether an entity is always salient or if an entity should be skipped when looking for salient ancestors.

In an instance in which the salient ancestor is null or the intended referent is otherwise indicated as always salient, then the intended referent may be described without reference to a salient ancestor. For example, in a geographic ontology or hierarchy, Chicago and Springfield would both be beneath the state of Illinois; however Chicago would likely be marked as always salient (because in most contexts "Chicago" by itself is sufficient). On the other hand, Springfield would not be marked as always salient and would have Illinois as a salient ancestor, because "Springfield" without "Illinois" would not be meaningful. Further, in a sports ontology, a player such as David Beckham or Ronaldo may be marked as always salient, whereas Freddi Montero may require a salient ancestor of Seattle Sounders FC in a textual output. In some examples, Seattle Sounders may need a further salient ancestor of Major League Soccer, in other example textual outputs.

In some example embodiments a discourse model 206 is embodied by or may be accessed by the microplanner 132. The discourse model 206 is configured to record the entities previously referred to in the present text (e.g. entities mentioned in previous phrase specifications), along with the referring expressions that were used to refer to them. For example, and with reference to FIG. 4, if a previous referring expression referred to "right engine casings", the next referring expression may only need to refer to "the turbine" since the right engine is already salient. As such, the referring expression generation system 208 may access the discourse model 206 in order to determine the previous entities referred to.

In some example embodiments, the referring expression generation system 208 may determine the lowest common ancestor in the hierarchy 202 between an intended referent and the previous referent. Using the lowest common ancestor, the intended referent and the salient ancestors, a referring expression, for example in the form of a referring noun phrase, is generated by the referring expression generation system 208 by including the default descriptors of the intended referent and its ancestors (e.g. by following the salient ancestor links) until the lowest common ancestor, or one of its ancestors that is salient, is reached. The generation of the referring expression is further described with reference to FIG. 3.

FIG. 3 illustrates an example flow diagram that may be performed by the referring expression generation system 208 in accordance with some example embodiments of the present invention. As is shown in block 302, the referring expression generation system 208 may identify an intended referent. The referring expression generation system 208 may be activated or otherwise executed by the microplanner 132, such as in an instance in which the microplanner is applying one or more rules (e.g. lexicalization rules) to a slot in a message that specifies an entity. In other embodiments, the referring expression generation system 208 may access or otherwise receive the intended referent via the microplanner 134, the natural language generation system 108, a lexicalization rule and/or the like.

In block 304, the referring expression generation system 208 may access the discourse model 206 to obtain the previous entity referred to. The previous entity referred to is the last or prior entity that was the intended referent in the generation of a referring expression. The previous entity referred to may then be identified or otherwise located in the hierarchy by the referring expression generation system 208. Using the previous entity referred to, the referring expression generation system 208 may be configured to set a lowest common ancestor to be the lowest entity within the hierarchy that is an ancestor of both the intended referent and the previous entity referred to in block 306. In an instance in which the previous entity referred to is null, then the lowest common ancestor may be set to a root entity of the hierarchy (e.g. Super Puma in FIG. 4).

In block 308, the default descriptor of the intended referent in the reference model is added to a descriptor queue. In some example embodiments, the descriptor queue is initialized as an empty queue prior to the first instance of block 308. Alternatively or additionally, the process shown in FIG. 3 may be configured to end in an instance in which the intended referent is identified, such as by the reference model 204, a flag or the like, as always salient. In such cases, the referring expression (e.g. referring noun phrase) may then take the form of the default descriptor of the intended referent. As is shown in block 310, the target referent is set to be the intended referent.

As shown in block 312, a salient ancestor of the intended referent in the reference model may be identified, such as via the reference model 204. At decision block 314, the referring expression generation system 208 is configured to determine whether the salient ancestor is lower in the hierarchy than the lowest common ancestor. If so, then at block 316, the current salient ancestor is set as a new target referent. In block 318, the default descriptor for the new target referent is added to the descriptor queue and a new salient ancestor for the new target referent is determined in block 312 The process of blocks 312-318 continues until, at decision block 314, the salient ancestor of the current target referent is higher than or equal to the lowest common ancestor. As noted, during each iteration through blocks 312-318, the default descriptor for the target referent is added to the descriptor queue. As such, the hierarchy is traversed using salient ancestor links. For example salient ancestor links may be represented as:

(1) start with TARGET
(2) go to Salient Ancestor (TARGET)
(3) go to Salient Ancestor (Salient Ancestor (TARGET))
(4) go to Salient Ancestor (Salient Ancestor (Salient Ancestor (TARGET))

Alternatively or additionally, in some examples other methods of traversal may be used such as, but not limited to, traversing each hierarchy and skipping those entities marked as to be ignored, traversing the hierarchy and including parent entities, and/or the like.

At block 320, the first element of the descriptor queue is removed and designated as the head noun of a referring noun phrase. In some example embodiments, the head noun may be assigned a determiner of "the". For example if the intended referent was "Super Puma", the default descriptor may be stored in the referring noun phrase as "the Super Puma".

At decision block 322, in an instance in which the descriptor queue is not empty, it is determined whether a predetermined premodifier count as been reached. In some examples, a premodifier count is predetermined and indicates the maximum number of premodifiers that may be placed before the head noun in the referring noun phrase. In an instance in which the premodifier count has not been reach or satisfied, then, at block 324, the default descriptor of the first element of the descriptor queue is set as a premodifier to the head noun in the referring noun phrase. For example, in an instance in which a blade is the intended referent, "turbine" may be added as a premodifier resulting in a referring expression "the turbine blades". The premodifier count is also incremented in block 324. Such a process continues until the premodifier count is reached or the descriptor queue is empty.

In an instance in which the maximum premodifier count is reached or the descriptor queue is empty, then at decision block 326, it is determined whether the descriptor queue is empty. If the descriptor queue is not empty, then at block 328, the first element of the descriptor queue is set as a postmodifier to the head noun in the referring noun phrase. In some examples the first element is added to a prepositional phrase having the proposition "of" and is then added to the referring noun phrase. For example, in an instance in which a blade is the intended referent and "turbine" is the premodifier, "right engine" may be added as the postmodifier resulting in a referring expression "the turbine blade of the right engine". Such a process continues until the descriptor queue is empty.

At block 330, the referring noun phrase is returned as the referring expression for use in a phrase specification and eventually the textual output of the natural language generation system 102. Alternatively or additionally, the discourse model 206 is updated to reflect the most recently identified intended referent.

Alternatively or additionally, one or more entities may not have a default descriptor in a reference model. For example, in the hierarchy of FIG. 4, Gear 1 through to Gear 8 may not be assigned individual default descriptors and, in such example cases, the entities may be referred to by the name of a class, a type or the like (e.g. "gear").

By way of example, in order to generate a referring expression for an entity that does not have a default descriptor, the referring expression generation system 208 may, in some example embodiments, determine whether the intended referent has been previously referred to. In an instance in which the intended referent has not been previously referred to, then the referring noun phrase may include "a" and the class or type of the intended referent (e.g. a gear). In an instance in which the intended referent has been previously referred to, then the referring expression generation system 208 may determine the previous references in the one or more phrase specifications to a same class or type via the discourse model. In an instance in which the intended referent is the most recently referred-to entity in the previously referred-to entities then the referring noun phrase may include the determiner "the" and the intended referent class or type name. Otherwise the referring noun phrase is generated to include "one of the" and the entity is set to plural (e.g. "one of the gears"). Alternatively or additionally, sets may be referred to in a same or similar manner. For example, if referring to multiple unnamed entities of the same type and in the same hierarchy position (e.g. the gears), phrases such as "four of the gears" or "all of the gears" may be returned.

FIG. 4 illustrates an example part-of hierarchy that may be accessed by the referring expression generation system in accordance with some example embodiments of the present invention. In some examples, the part-of hierarchy shown with respect to FIG. 4 was generated based on the official air accident report referenced below; however in other examples, the part-of hierarchy may be provided by an equipment manufacturer, an equipment manager and/or the like. The example part-of hierarchy includes a power system and a transmission system of a Eurocopter AS332 L2 Super Puma Helicopter. As is described herein, the hierarchy of FIG. 4 may be used to generate referring expressions, such as those underlined expressions in the following example text:

Initial examination of the engines the revealed significant damage to their external casings. The free turbine case of the right engine was found to have been breached and the turbine blades were found severely damaged. The epicyclic reduction gearbox had suffered significant damage. The epicyclic module case and ring gear had split vertically and had separated from the main module, (see FIG. 20). The first stage planet carrier was found lying on the remains of the main module and the remains of all eight first stage planet gears, together with pieces of a second stage planet gear, were recovered from within the MGB main module and its surrounding area.

Text was taken from Section 1.12.2 of an official air accident report (http://www.aaib.gov.uk/cms_resources/2-2011%20G-REDL.pdf).

For example in order to describe the blades 402, the referring expression generation system 210 is configured to determine a previous entity referred to in the text, such as via the discourse model 206. In this example, the previous entity referred to in the text was the free turbine case 404. Therefore, in this example, the lowest common ancestor in the hierarchy, between the free turbine case 404 and the blades 402, is the right engine 406. A reference model, such as reference model 204, may indicate that the turbine 408 is the salient ancestor of the blades 402. As such, the blades 402 are designated to be referred to by the head noun of a referring noun phrase. Because the turbine 408 is located beneath the lowest common ancestor in the hierarchy, the turbine 408 is then set as the target referent and its salient ancestor, the right engine 406, is determined. In this example, the right engine 406 is the salient ancestor of the turbine 408 and is also the lowest common ancestor and therefore the process ends. The referring noun phrase may be then generated by the referring expression generation system 210 having "blades" as the head noun and having "turbine" as a premodifier or postmodifier. For example, the referring noun phrase may be: "the turbine blades" or "the blades of the turbine".

FIG. 5 is an example block diagram of an example computing device for practicing embodiments of an example configurable microplanner. In particular, FIG. 5 shows a computing system 500 that may be utilized to implement a natural language generation environment 100 having a natural language generation system 102 including, in some examples, a document planner 130, a microplanner 132 and/or a realizer 134 and/or a user interface 510. One or more general purpose or special purpose computing systems/devices may be used to implement the natural language generation system 102 and/or the user interface 510. In addition, the computing system 500 may comprise one or more distinct computing systems/devices and may span distributed locations. In some example embodiments, the natural language generation system 102 may be configured to operate remotely via the network 550. In other example embodiments, a pre-processing module or other module that requires heavy computational load may be configured to perform that computational load and thus may be on a remote device or server. For example, the realizer 134 may be accessed remotely. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination to achieve the capabilities described herein.

In the example embodiment shown, computing system 500 comprises a computer memory ("memory") 501, a display 502, one or more processors 503, input/output devices 504 (e.g., keyboard, mouse, CRT or LCD display, touch screen, gesture sensing device and/or the like), other computer-readable media 505, and communications interface 506. The processor 503 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 5 as a single processor, in some embodiments the processor 503 comprises a plurality of processors. The plurality of processors may be in operative communication with each other and may be collectively configured to perform one or more functionalities of the reference system as described herein.

The natural language generation system 102 is shown residing in memory 501. The memory 501 may comprise, for example, transitory and/or non-transitory memory, such as volatile memory, non-volatile memory, or some combination thereof. Although illustrated in FIG. 5 as a single memory, the memory 501 may comprise a plurality of memories. The plurality of memories may be embodied on a single computing device or may be distributed across a plurality of computing devices collectively configured to function as the natural language system, the microplanner and/or the reference system. In various example embodiments, the memory 501 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 102 may be stored on and/or transmitted over the other computer-readable media 505. The components of the natural language generation system 102 preferably execute on one or more processors 503 and are configured to enable operation of a configurable microplanner, as described herein.

Alternatively or additionally, other code or programs 530 (e.g., an administrative interface, a Web server, and the like) and potentially other data repositories, such as other data sources 540, also reside in the memory 501, and preferably execute on one or more processors 503. Of note, one or more of the components in FIG. 5 may not be present in any specific implementation. For example, some embodiments may not provide other computer readable media 505 or a display 502.

The natural language generation system 102 is further configured to provide functions such as those described with reference to FIG. 1. The natural language generation system 102 may interact with the network 550, via the communications interface 506, with remote data sources 556 (e.g. remote reference data, remote performance data, remote aggregation data, remote knowledge pools and/or the like), third-party content providers 554 and/or client devices 558. The network 550 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 550 may take the form of the internet or may be embodied by a cellular network such as an LTE based network. In this regard, the communications interface 506 may be capable of operating with one or more air interface standards, communication protocols, modulation types, access types, and/or the like. The client devices 558 include desktop computing systems, notebook computers, mobile phones, smart phones, personal digital assistants, tablets and/or the like.

In an example embodiment, components/modules of the natural language generation system 102 are implemented using standard programming techniques. For example, the natural language generation system 102 may be implemented as a "native" executable running on the processor 503, along with one or more static or dynamic libraries. In other embodiments, the natural language generation system 102 may be implemented as instructions processed by a virtual machine that executes as one of the other programs 530. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 556.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 6 is a flowchart illustrating an example method performed by a reference system in accordance with some example embodiments described herein. As is shown in operation 602, an apparatus may include means, such as the microplanner 132, the reference model 204, the referring expression generation system 208, the processor 503, or the like, for identifying an intended referent to be referred to in a textual output. In some example embodiments, the default descriptor of the intended referent is set as a head noun of a referring noun phrase. Alternatively or additionally, the default descriptor of an entity further comprises at least one of a class name or a type name.

As is shown in operation 604, an apparatus may include means, such as the microplanner 132, the hierarchy 202, the discourse model 206, the reference system 208, the processor 503, or the like, for determining a lowest common ancestor for the intended referent and a previously referred-to entity within a part-of hierarchy, such as an equipment part-of hierarchy. As is shown in operation 606, an apparatus may include means, such as the microplanner 132, the hierarchy 202, the discourse model 206, the referring expression generation system 208, the processor 503, or the like, for determining the previously referred-to entity based on a last entity mentioned in a discourse model. In some example embodiments, the previously referred-to entity is set to a root component of the part-of hierarchy in an instance in which the previous reference is set to null.

As is shown in operation 608, an apparatus may include means, such as the microplanner 132, the hierarchy 202, the referring expression generation system 208, the processor 503, or the like, for determining that a salient ancestor of the intended referent is higher than or equal to the lowest common ancestor in the part-of hierarchy, such that the referring noun phrase comprises the default descriptor of the intended referent. As is shown in operation 610, an apparatus may include means, such as the microplanner 132, the hierarchy 202, the referring expression generation system 208, the processor 503, or the like, for determining that a salient ancestor of the intended referent is lower in the part-of hierarchy than a lowest common ancestor in an instance in which the intended referent is marked as not salient.

As is shown in operation 612, an apparatus may include means, such as the microplanner 132, the hierarchy 202, the reference model 204, the referring expression generation system 208, the processor 503, or the like, for causing the salient ancestor to be set as a current target referent and a new salient ancestor to be determined for the current target referent, wherein the default descriptor of each current target referent is added to the referring noun phrase and the part-of hierarchy is traversed via salient ancestor links until the new salient ancestor of the current target referent is higher than or equal to the lowest common ancestor.

In some example embodiments, the referring noun phrase comprises a predetermined maximum number of premodifiers of the default descriptor of the intended referent, wherein the premodifiers comprise one or more default descriptors of the one or more parts of the part-of hierarchy traversed. In additional example embodiments, the referring noun phrase comprises a number of postmodifiers of the default descriptor of the intended referent, wherein the postmodifiers comprise the remaining one or more default descriptors of the one or more parts of the part-of hierarchy traversed not included as premodifiers.

FIGS. 3 and 6 illustrate example flowcharts of the operations performed by an apparatus, such as computing system 500 of FIG. 5, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 501 of an apparatus employing an embodiment of the present invention and executed by a processor 503 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 3 and 6, when executed, convert a computer or processing circuitry into a particular machine configured to perform an example embodiment of the present invention. Accordingly, the operations of FIGS. 3 and 6 define an algorithm for configuring a computer or processor, to perform an example embodiment. In some cases, a general purpose computer may be provided with an instance of the processor which performs the algorithm of FIGS. 3 and 6 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIG. 6). It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A natural language generation method for generating a referring noun phrase for an intended referent found in one or more messages within a document plan, the method comprising:
    arranging, using a processor, one or more messages in a document plan, wherein messages represent a phrase or a simple sentence and are created in an instance in which an input data stream comprises data that satisfies one or more message requirements, and wherein at least a portion of the input data stream comprises non-linguistic data;
    identifying an intended referent in a message of the one or more messages to be referred to in a textual output;
    determining a lowest common ancestor for the intended referent and a previously referred-to entity within a part-of hierarchy;
    determining a salient ancestor of the intended referent within the part-of hierarchy;
    generating a referring noun phrase for the intended referent to be included in a textual output by traversing the part-of hierarchy from the salient ancestor to the lowest common ancestor such that a default descriptor is added to a queue for at least a portion of entities traversed in the part-of-hierarchy, wherein the reference noun phrase comprises a default descriptor of the intended referent and one or more default descriptors of one or more parts of the part-of hierarchy that are traversed;
    generating the textual output comprising the referring noun phrase such that it is displayable on a user interface, wherein the textual output linguistically describes at least a portion of the input data stream; and
    displaying the textual output via a display device.

2. A method according to claim 1, wherein the one or more parts of the part-of hierarchy that are traversed based on one or more salient ancestor links.

3. A method according to claim 1, further comprising:
    determining that the intended referent is marked as salient; and
    causing the referring noun phrase to solely comprise the default descriptor of the intended referent.

4. A method according to claim 1, further comprising:
    determining that the salient ancestor is equal to the lowest common ancestor; and
    causing the referring noun phrase to comprise the default descriptor of the intended referent.

5. A method according to claim 1, further comprising:
    determining the previously referred-to entity based on a last mentioned entity in a discourse model.

6. A method according to claim 5, wherein the previously referred-to entity is set to a root component of the part-of hierarchy in an instance in which the previously referred-to entity is set to null.

7. A method according to claim 1, wherein the default descriptor of an entity is at least one of a default descriptor, a class name or a type name.

8. A method according to claim 1, further comprising:
    determining that one or more parts of the part-of hierarchy traversed are marked as ignore, wherein a default descriptor of the one or more parts of the part-of hierarchy that are marked as to be ignored are not included in the referring noun phrase.

9. A method according to claim 1, wherein the default descriptor of an entity further comprises at least one of a class name or a type name.

10. A method according to claim 1, wherein the referring noun phrase comprises a predetermined maximum number of premodifiers of the default descriptor of the intended referent, wherein the predetermined number of premodifiers comprise one or more default descriptors of the one or more parts of the part-of hierarchy that are traversed.

11. A method according to claim 10, wherein the referring noun phrase comprises a set of postmodifiers of the default descriptor of the intended referent, wherein the set of postmodifiers comprise one or more default descriptors of one or more parts of the part-of hierarchy that are traversed that were not included as premodifiers.

12. A method according to claim 1, wherein generating the referring noun phrase further comprises:
    removing a first element in the queue, wherein the first element is designated as a head noun in the referring noun phrase.

13. A method according to claim 12, wherein generating the referring noun phrase further comprises:
    removing a next element in the queue; and
    setting the next element as a premodifier to the head noun; and
    in instance in which a predetermined premodifier count threshold is satisfied, removing an element from the queue and setting it as a post modifier to the head noun.

14. An apparatus comprising:
    at least one processor; and
    at least one memory including computer program code, the at least one memory and the computer program code configured to, with the at least one processor, cause the apparatus to at least:
    arrange one or more messages in a document plan, wherein messages represent a phrase or a simple sentence and are created in an instance in which an input data stream comprises data that satisfies one or more message requirements, wherein at least a portion of the input data stream comprises non-linguistic data;
    identify an intended referent in a message of the one or more messages to be referred to in a textual output;
    determine a lowest common ancestor for the intended referent and a previously referred-to entity within a part-of hierarchy;
    determine a salient ancestor of the intended referent within the part-of hierarchy;
    generate a referring noun phrase for the intended referent to be included in a textual output by traversing the part-of hierarchy from the salient ancestor to the lowest common ancestor such that a default descriptor is added to a queue for at least a portion of entities traversed in the part-of-hierarchy, wherein the reference noun phrase comprises a default descriptor of the intended referent and one or more default descriptors of one or more parts of the part-of hierarchy that are traversed;

generate the textual output comprising the referring noun phrase such that it is displayable on a user interface, wherein the textual output linguistically describes at least a portion of the input data stream; and display the textual output via a display device.

15. An apparatus according to claim 14, wherein the at least one memory including the computer program code is further configured to, with the at least one processor, cause the apparatus to:

determine that the intended referent is marked as salient; and cause the referring noun phrase to solely comprise the default descriptor of the intended referent.

16. An apparatus according to claim 14, wherein the at least one memory including the computer program code is further configured to, with the at least one processor, cause the apparatus to:

determine that the salient ancestor is equal to the lowest common ancestor; and cause the referring noun phrase to comprise the default descriptor of the intended referent.

17. An apparatus according to claim 14, wherein the at least one memory including the computer program code is further configured to, with the at least one processor, cause the apparatus to:

determine the previously referred-to entity based on a last mentioned entity in a discourse model.

18. A non-transitory computer readable memory medium having program code instructions stored thereon, the program code instructions which when executed by an apparatus cause the apparatus at least to:

arrange one or more messages in a document plan, wherein messages represent a phrase or a simple sentence and are created in an instance in which an input data stream comprises data that satisfies one or more message requirements, wherein at least a portion of the input data stream comprises non-linguistic data;

identify an intended referent in a message of the one or more messages to be referred to in a textual output;

determine a lowest common ancestor for the intended referent and a preyiously referred-to entity within a part-of hierarchy;

determine a salient ancestor of the intended referent within the part-of hierarchy;

generate a referring noun phrase for the intended referent to be included in a textual output by traversing the part-of hierarchy from the salient ancestor to the lowest common ancestor such that a default descriptor is added to a queue for at least a portion of entities traversed in the part-of-hierarchy, wherein the reference noun phrase comprises a default descriptor of the intended referent and one or more default descriptors of one or more parts of the part-of hierarchy that are traversed;

generate the textual output comprising the referring noun phrase such that it is displayable on a user interface, wherein the textual output linguistically describes at least a portion of the input data stream; and display the textual output via a display device.

19. A computer program product according to claim 18, further comprising program code instructions configured to:

determine that the intended referent is marked as salient; and cause the referring noun phrase to solely comprise the default descriptor of the intended referent.

20. A computer program product according to claim 18, further comprising program code instructions configured to:

determine that the salient ancestor is equal to the lowest common ancestor; and cause the referring noun phrase to comprise the default descriptor of the intended referent.

21. A computer program product according to claim 18, further comprising program code instructions configured to:

determine the previously referred-to entity based on a last mentioned entity in a discourse model.

22. A computer program product according to claim 21, wherein the previously referred-to entity is set to a root component of the part-of hierarchy in an instance in which the previously referred-to entity is set to null.

* * * * *